United States Patent [19]

Margotta

[11] Patent Number: 4,655,483
[45] Date of Patent: Apr. 7, 1987

[54] BOUNDARY SEAL FOR VESSEL PENETRATION

[75] Inventor: Kenneth V. Margotta, Rockville, Conn.

[73] Assignee: Combustion Engineering, Inc., Windsor, Conn.

[21] Appl. No.: 609,919

[22] Filed: May 14, 1984

[51] Int. Cl.$^4$ .............................................. F16L 55/00
[52] U.S. Cl. .................................. 285/169; 285/415; 285/348
[58] Field of Search ............... 285/169, 414, 415, 330, 285/348, 39

[56] References Cited

U.S. PATENT DOCUMENTS

| | | | |
|---|---|---|---|
| 327,737 | 10/1885 | Strong | 285/169 X |
| 1,209,063 | 12/1916 | Steneck | 285/158 X |
| 1,828,170 | 10/1931 | Bristol | 285/158 |
| 1,987,366 | 1/1935 | Ford | 285/158 X |
| 1,992,200 | 2/1935 | Ford | 285/169 X |
| 2,148,863 | 2/1939 | Key | 285/169 X |
| 2,233,599 | 3/1941 | Gilbert, Sr. | 285/349 X |
| 2,434,343 | 1/1948 | Barkelew | 285/169 X |
| 3,214,203 | 10/1965 | Mongodin | 285/414 |
| 3,937,500 | 2/1976 | Sato | 285/414 X |
| 4,174,123 | 11/1979 | Schluderberg | 285/192 X |

*Primary Examiner*—Richard J. Scanlan, Jr.
*Attorney, Agent, or Firm*—John H. Mulholland

[57] ABSTRACT

A connector device to provide a primary pressure boundary between a flanged nozzle (18) and a column (20) concentrically disposed therein, including a closure member (26) for compressing a seal ring (22) against the nozzle flange (18). The closure member (26) includes a hub portion (34) defining an annular space (36) between the closure member and the column. Graphite gasket rings (40) are inserted into the annular space (36), and drive unit including a sleeve (42) actuator nut (50), and collar (54) is attached to the column at the collar location. Actuation of the nut (50) against the collar (54) draws the column (20) into rigid engagement with the closure member (26), and then advances the drive sleeve (42) along the annular space (36) to compress the gasket ring (40), thereby completing the fluid-tight connection.

7 Claims, 3 Drawing Figures

BOUNDARY SEAL FOR VESSEL PENETRATION

BACKGROUND OF THE INVENTION

This invention relates to fluid tight connections, and more particularly to a fluid tight connection between concentric tubes or the like.

In many industrial applications, particularly in nuclear power related technologies, penetrations must be made in large vessels within which processes occur at high pressure. In the case of a nuclear reactor vessel, such penetrations are necessary for providing openings through which control rods or instrumentation may be inserted into the reactor core. Typically, nozzles are welded to the vessel wall to provide support surfaces on which other equipment associated with the manipulation of the control rods or instruments, may be mounted.

In many instances, a separate column or conduit passes concentrically within the nozzle and may be attached internally to the nozzle or to other structure within the vessel. Occasionally, the equipment mounted on the nozzle, or the column within the nozzle, must be removed for maintenance or repair. But during normal operation, it is required that a fluid-tight closure or connection be provided between the nozzle and the column contained therein, to prevent leakage of radioactive or otherwise environmentally disruptive fluid from within the vessel.

In one known method for connecting and sealing the column to the nozzle, metal-to-metal seals are actuated by "Marman" clamps (a product of the Aeroquip Corp., Los Angeles, CA.). Typically, a hydraulic tool is attached to a groove or to other mounting means in the nozzle or an adapter member on the nozzle, and is employed to seat the metal seals. After the seals are set, the Marman clamp halves are bolted together to maintain the seal in the compressed state. The hydraulic tool is then removed and an autoclave-type metal seal is then compressed by torquing several jacking screws around the perimeter of the nozzel. This technique is time-consuming and requires holding close tolerances.

SUMMARY OF THE INVENTION

The present invention is directed to a fluid-tight connector device and method of installation, which is particularly useful for providing a primary pressure boundary between concentric tubes and conduits, or the like, such as are associated with vessel and nozzle penetrations in nuclear power plants.

The connector device includes a closure member clamped to a flange on the outer tube, or nozzle, and having a shoulder or other means for engaging the column and limiting the relative axial movement therebetween. The closure member also includes a hub portion concentrically spaced about the column and adapted to receive and support an annular gasket member. The closure member is drawn against the nozzle flange to compress a seal therebetween, to prevent leakage between the flange and closure member. A drive unit is attached to the column above the closure member, for the purpose of drawing the column tightly against the closure member then advancing a drive sleeve along the annular space between the hub portion and the column, such that the annular gasket therebetween can be compressed to form a second leak tight seal. In the preferred embodiment, the drive unit includes a drive sleeve having a lower portion within the annular space and a threaded upper portion, an actuation means such as a nut, threaded to the upper portion of the drive sleeve, and a collar, preferably a split collar, rigidly connected to the column in a groove provided therein. Once the closure member has been clamped or drawn fully against the first seal and nozzle flange, the drive unit is attached to the column. The drive unit is then actuated by simply turning the actuation nut with a wrench, such that the collar member is loaded to carry the weight of the column and draw it against the closure member. Continued loading of the collar advances the drive sleeve against the gasket to effect the second seal.

In more general terms, the inventive connector device forms an initial closure and seal between the nozzle flange and the closure member, then a driving unit is attached to the column in order to "tighten up" the overall connection, before effectuating a second seal on the gasket to complete the primary pressure boundary. This "tightening" is accomplished by first establishing rigid upper and lower support surfaces at the collar connection to the column and at the engagement of the closure member with the column. The arrangement of actuator and drive sleeve which interact with the collar member, in effect "expands" the drive sleeve.

The connector is installed by placing the closure member of the column and trapping the seal ring between the nozzle flange and the closure member, then tightening the member as by clamping. The gasket rings are inserted into the annular space between the hub portion of the connector member and the column. The drive sleeve is inserted into the annular space to bear upon the gasket. The actuator nut, is threaded to the upper portion of the drive sleeve, and the collar is attached rigidly to the column such that the nut can load the collar. As the actuator nut is rotated the collar is loaded and eventually the column is longitudinally displaced relative to the closure member until a tight connection is made. Continued actuation drives the sleeve along the annular space to compress the gasket to the desired degree.

With the present invention, the connector device may be installed by one man with simple hand held tools. No special tools or hydraulically powered tools are required. The type of gasket contemplated by the invention, graphite or Grafoil is much more tolerant of sealing surface imperfections than are metal gaskets such as used in the prior art. The assembly technique is more suitable for a field application in that it is more rugged than other known designs, and can accept deviations in the assembly method and still provide a good seal.

BRIEF DESCRIPTION OF THE DRAWINGS

Additional features and advantages of the preferred embodiment of the invention will be described hereinbelow with reference to the accompanying drawings, in which.

DESCRIPTION OF THE PREFERRED EMBODIMENT

The connector components of the preferred embodiment of the invention, and their interrelationship, will be described in connection with the method of installation on a nozzle penetration of a nuclear reactor vessel, although other embodiments are within the scope of the invention.

Figure 1:
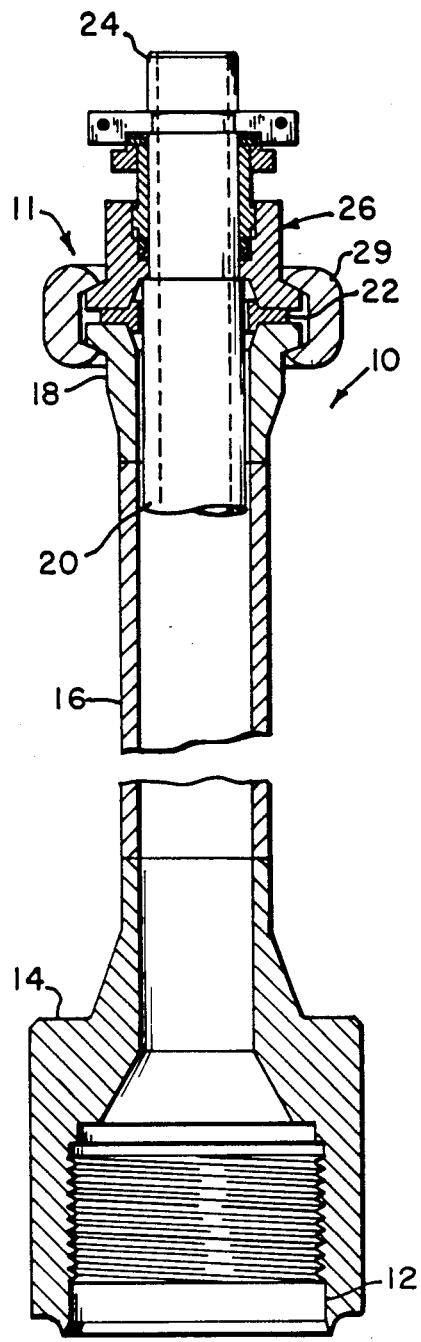
FIG. 1 is an assembly view of the invention in section, after installation to the core exit thermocouple nozzle of a nuclear reactor vessel.

FIG. 1 shows a thermocouple nozzle penetration assembly 10 with the pressure boundary connector device 11 fully installed. A nozzle boss 12 typically is welded to the vessel (not shown) and is adapted to mate externally with a nozzle adaptor 14 that typically extends upward to form a generally cylindrical nozzle neck 16. For implementation of the preferred embodiment of the invention, a nozzle flange 18 is formed on or welded to the nozzle neck 16. A column 20 or similar tubular or conduit structure extends above and is concentrically supported within the nozzle, typically by attachment to structure within the vessel, but such attachment is not necessary for the practice of the present invention. There should, however, be some resiliency or freedom for the column to move in the axial direction relative to the nozzle, at least over a relatively short distance.

The bore of the nozzle boss 12 is directly exposed to the pressure of the process fluid within the vessel. This pressure urges fluid upwardly between the column 20, and the neck 16 and flange 18 portions of the nozzle. It is the primary objective of the present invention to form a connection between the column 20 and the nozzle 16, 18 to prevent leakage of the pressurized fluid to the environment. The invention thus provides a primary pressure boundary connection which can, typically hold against 2500 psi or more, while at a temperature of 650° F. and in a high radiation field.

Figure 2:
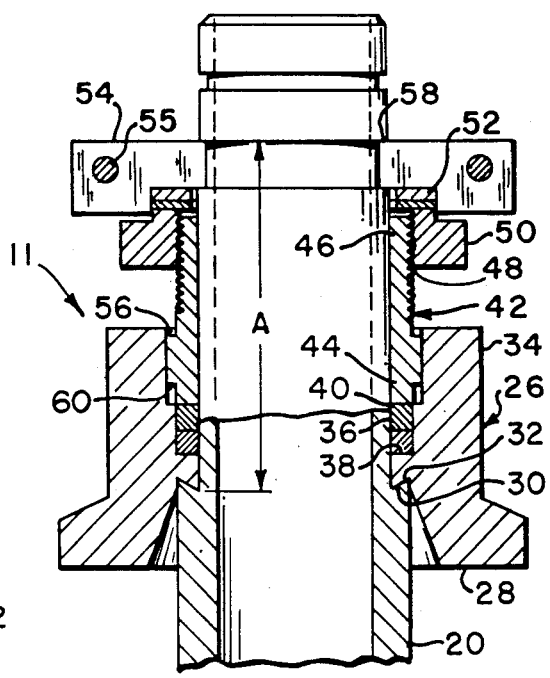
FIG. 2 is an enlarged view, in section, of the connector device in accordance with the preferred embodiment of the invention.

With reference to FIGS. 1 and 2, the preferred and illustrated method of installing the inventive connector device and its components will now be described. The nozzle flange 18 is tapered outwardly from a nozzle bore to a radially extending face, as seen in FIG. 1, to receive a metal seal ring 22 of the type such as Grayloc 3 GR25, available from the Gray Tool Company, Houston, Tex. The first step in the installation process, with the flange 18 in place, is to slide the seal ring 22 over the column upper end 24 until it seats on the nozzle flange 18. Closure member 26 is likewise passed over the column upper end until it seats on the seal ring 22. The closure flange 28 is, like the nozzle flange 18, adapted to mate with the seal ring 22 and accept a clamp member 29, preferably of the type available as Grayloc 3 GR25. Clamps 29 are tightened or drawn in accordance with the supplier's specifications until the seal ring 22 is sufficiently compressed to maintain the pressure boundary between the nozzle flange 18 and closure flange 28.

The closure member 26 has an internal closure surface or shoulder 30 which is adapted to engage a column shoulder 32 in the column 20 above the elevation of flange 18 and seal 22. The shoulders 30, 32 are not normally fully engaged at the moment the clamp 29 is fully tightened, and therefore a fluid leakage path remains between the closure member 26 and the upper portion of the column 20. In order to seal this path quickly and effectively, additional components of the inventive device are then installed into spaces provided by the closure hub portion 34 of the closure member 26.

Figure 3:
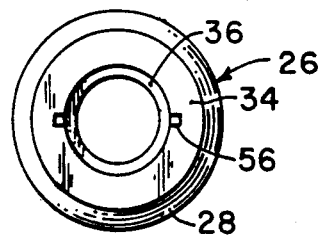
FIG. 3 is a plan view of the closure member of the connector device shown in FIG. 2, with the gasket and drive sleeve removed for clarity.

The closure hub 34 will be more fully understood with reference to FIGS. 2 and 3, the latter showing the closure member 26 in plan view. The internal diameter of the closure hub portion 34 is greater than the outer diameter of the column 20 to provide an annular space 36 between the hub 34 and adjacent column 20. A support surface 38 at the lower extremity of the annular space 36 is provided for receiving one or more packing or gasket rings 40, which are passed over the column upper end and inserted into the annular space 36 until they bear upon the support surface 38. These gasket rings 40 are preferably made of graphite, of the type commonly known as Grafoil.

Next, a generally cylindrical drive sleeve 42 is passed over the column upper end 24 into the annular space 36 until the sealing end 44 contacts the gaskets 40. The upper portion or actuated end 46 of the drive sleeve has threads 48 to receive a hexagonal drive or actuator nut 50. An annular thrust bearing 52 is then placed over the drive nut 50. A collar 54, is then rigidly connected transversely to the column. A split ring collar 54 (half is shown) is secured by bolts 55, to groove 58.

The drive nut 50 is preferably threaded onto the mating threads 48 before they are passed over the end of the column 24, in order to minimize installation time. Prior to installation, the distance "A" on the column 20 is typically known, and serves as a bench mark for appropriately sizing the gasket rings 40, and drive unit sleeve 42, actuator 50, thrust bearing 52 and collar 54.

Once the connector components described above and shown in FIG. 2 have been assembled to hand tightness, the drive sleeve 42 is held to resist rotation relative to the column 20, while the drive nut 50 is rotated. This has the effect of axially expanding the drive unit 42, 50. Continued turning of the drive nut 50 lifts the column 20 until the shoulders 30, 32 become tightly engaged. The shoulders may meet obliquely, as shown in FIG. 2, or they may be square (not shown). Continued turning of the drive nut 50 causes the drive sleeve 42 to slide axially downward relative to the column 20, such that the sealing end 44 compresses the gaskets 40 to accomplish the desired primary pressure boundary seal.

In the preferred embodiment, the means for preventing rotation of the drive sleeve 42 during torquing of the drive nut 50, includes keys or splines 60 that fit into slots 56 in the hub portion 34 of the closure member 26, as illustrated in FIGS. 2 and 3. Alternatively, the annular space 36 may be of uniform dimension along the column 20, and projections (not shown) may be provided on the drive sleeve in the region between the upper end of the closure member 26 and the lower end of the drive nut 50. In the latter arrangement, one tool is required for holding the projections, while another tool is employed to torque the drive nut 50. In the preferred embodiment, the only tool required is a simple wrench to torque the drive nut 50 until the desired pressure has been applied to the gasket rings 40.

In the situation usually encountered, the column 20 is a permanent fixture associated with the vessel, and the locations of the shoulder 32 and groove 58 are known prior to installation of the connector device. Furthermore, the nozzle structure encountered may include a flange 18 of a type other than that illustrated in FIG. 1. It should be understood that a variety of closure assemblies, i.e., nozzle flanges 18, seal rings 22, and closure flange shapes 28 as well as clamping means 29, may be employed with the present invention.

A key feature of the present invention is that the closure member 26 and the collar 54 provide unyielding, transverse supporting surfaces, between which drive unit components are expanded. The expanding arrangement of drive sleeve 42 and drive nut 50, compresses the gasket rings 40, located between the closure member 26 and the column 20. The invention thus requires that means such as shoulders 30, 32 be provided to limit the upward travel or movement of the column 20 relative to the closure member 26.

Although the closure member 26 contributes to the compressive loading of both the seal ring 22 and the gasket rings 40, loading of these seals occurs in two distinct, sequential steps by two distinct, independent actuation mechanisms (i.e., clamp member 29 actuates seal ring 22, then drive unit 42, 50, 54 actuates gasket rings 40).

It will be evident to those skilled in this art that, with respect to the radioactivity considerations involved in servicing nuclear power reactors, the present invention provides significant advantages. The assembly time required is approximately one-half hour, about one hour less than existing techniques. Furthermore, the graphite seals employed with the preferred embodiment, are much less sensitive to surface imperfections than metallic seals. It is therefore possible to achieve a better seal even if the sealing surface has been slightly damaged. Finally, the assembly technique does not require hydraulic tooling, but merely a torque wrench.

I claim:

1. A fluid-tight connection between a nozzle and a concentric column supported therein, comprising:
   a flange formed on the upper end of said nozzle;
   seal means carried on the nozzle flange;
   said column disposed within the nozzle and extending above the nozzle flange, having shoulder means above said seal means;
   a closure member surrounding the column, having an outwardly flanged lower end bearing upon the seal means, internal shoulder means engaging said shoulder means on the column, an internal support surface above the internal shoulder, and a hub portion extending above the internal shoulder and spaced from said column, thereby defining an annular space above the support surface adapted to receive a generally annular gasket means;
   means for drawing the closure member toward the nozzle flange to compress the seal means therebetween;
   a generally cylindrical drive unit surrounding the column, including a drive sleeve having a lower end disposed within said annular space, and means rigidly attached to said column, actuation means engaging said rigidly attached means and said drive sleeve for effecting relative axial movement between the drive sleeve and the column;
   whereby an annular gasket located within said annular space may be compressed against said support surface by said drive sleeve to prevent fluid leakage between said closure member and said column.

2. The connection recited in claim 1, wherein said column includes groove means spaced above the shoulder, and said rigidly attached means includes collar means attached to said groove means, and said actuation means cooperating therewith to force the drive sleeve away from the collar means toward the gasket means.

3. The connection recited in claim 2, wherein said gasket means includes at least one generally annular graphite ring.

4. The connection recited in claim 3 wherein said drive sleeve has a threaded upper end and a lower portion disposed in said annular space, and said actuation means includes an actuating nut threadedly engaged to the upper end of the drive sleeve, and said collar means is a collar member attached to the column for limiting the upward travel of the actuating nut relative to the column.

5. A connector device for providing a fluid tight seal between a nozzle and a column supported concentrically within the nozzle, said nozzle having an upper flanged end and said column extending above the nozzle and having a shoulder intermediate the nozzle flange and upper end of the column, said device comprising:
   a closure member engaged between said nozzle flange and the shoulder on said column, said closure member including a hub portion concentrically spaced about the column above said column shoulder and having a support surface at the lower end thereof, said space and said support surface adapted to receive and support annular gasket means between the hub and the column adjacent thereto;
   a collar member adapted to rigidly engage said column above the hub portion, for providing a rigid loading surface transverse to the column;
   a drive sleeve member concentrically disposed along the column between the hub portion and the collar member, having a lower end disposed within the annular space and slidable axially therewithin;
   actuation means engaging the upper end of the drive sleeve and adapted to bear upon said collar member, for producing relative axial movement between said column and said drive sleeve;
   whereby as the actuation means is loaded against the collar, the drive sleeve advances within the annular space such that gasket means located and supported within the annular space, will be compressed to form a fluid tight seal between the hub portion and the adjacent column.

6. The connector device recited in claim 5, wherein the upper end of the drive sleeve includes a threaded portion, and wherein the actuation means is a threaded nut engaging and movable along said driving sleeve.

7. The connector device recited in claim 6, wherein the drive sleeve further includes means for preventing rotation of the drive sleeve about the column while the actuating means is rotated about and axially movable relative to the drive sleeve.

* * * * *